US009269981B2

United States Patent
Iyuke et al.

(10) Patent No.: US 9,269,981 B2
(45) Date of Patent: Feb. 23, 2016

(54) PROTON EXCHANGE MEMBRANE FUEL CELL

(75) Inventors: Sunny Esayegbemu Iyuke, Johannesburg (ZA); Hendrik Christoffel Van Zyl Pienaar, Johannesburg (ZA); Ambali Saka Abdulkareem, Johannesburg (ZA); Ayo Samuel Afolabi, Johannesburg (ZA); Christopher Avwoghokoghene Idibie, Johannesburg (ZA)

(73) Assignee: University of the Witwatersrand, Johannesburg (ZA)

( * ) Notice: Subject to any disclaimer, the term of this patent is extended or adjusted under 35 U.S.C. 154(b) by 458 days.

(21) Appl. No.: 13/378,462

(22) PCT Filed: Jun. 22, 2010

(86) PCT No.: PCT/IB2010/052823
§ 371 (c)(1),
(2), (4) Date: May 17, 2012

(87) PCT Pub. No.: WO2010/150189
PCT Pub. Date: Dec. 29, 2010

(65) Prior Publication Data
US 2012/0219873 A1 Aug. 30, 2012

(30) Foreign Application Priority Data
Jun. 23, 2009 (ZA) .................. 2009/04368

(51) Int. Cl.
*H01M 8/02* (2006.01)
*H01M 8/04* (2006.01)
*H01M 8/10* (2006.01)

(52) U.S. Cl.
CPC .......... *H01M 8/1023* (2013.01); *H01M 8/1048* (2013.01); *H01M 2300/0082* (2013.01); *H01M 2300/0091* (2013.01); *Y02E 60/523* (2013.01)

(58) Field of Classification Search
CPC ... H01M 8/1023; H01M 8/1048; H01M 8/10; H01M 2300/0091; H01M 2300/0082
USPC .......... 429/444, 434, 483, 442, 480, 482, 535
See application file for complete search history.

(56) References Cited

U.S. PATENT DOCUMENTS

| | | | |
|---|---|---|---|
| 5,679,482 A | 10/1997 | Ehrenberg et al. | |
| 2007/0077478 A1* | 4/2007 | Nguyen et al. | 429/33 |
| 2007/0082250 A1* | 4/2007 | Suzuki et al. | 429/35 |
| 2007/0212589 A1* | 9/2007 | Kobuchi et al. | 429/38 |

FOREIGN PATENT DOCUMENTS

| | | |
|---|---|---|
| CN | 1813367 A | 8/2006 |
| CN | 1944535 A | 4/2007 |

(Continued)

OTHER PUBLICATIONS

Jeong Won Kang and Ho Jung Hwang: "Fullerene Nano Ball Bearings: an Atomistic Study" Nanotechnology, vol. 15, Mar. 9, 2004, pp. 614-621, XP002600108 the whole document.

(Continued)

*Primary Examiner* — Kenneth Douyette
(74) *Attorney, Agent, or Firm* — Ladas & Parry LLP

(57) ABSTRACT

This invention relates to fuel cells, particularly proton exchange membrane fuel cells, more particularly to proton exchange membrane fuel cells employing nanocomposite sulphonated polystyrene-butadiene rubber-carbon nanoball (SPSBR-CNB) membranes as an electrolyte.

20 Claims, 18 Drawing Sheets

(56) References Cited

FOREIGN PATENT DOCUMENTS

CN 101071875 A 11/2007
WO 2007/101051 A2 9/2007

OTHER PUBLICATIONS

A. S. Afolabi, A. S. Abdulkareem, S. E. Iyuke: "Synthesis of Carbon Nanotubes and Nanoballs by Swirled Floating Catalyst Chemical Vapour Deposition Method" Journal of Experimental Nanoscience, vol. 2, No. 4, Dec. 4, 2007, XP002600109 the whole document.
International search report, Dec. 29, 2010, for application # PCT/IB2010/052823.
Search Report dated Dec. 9, 2013 for corresponding Chinese Application No. 201080037413.7.
Notification of the Second Office Action dated Aug. 5, 2014 for Chinese Application No. 2010800374137.
Espacenet English abstract of CN 1944535 A, Apr. 2007.

* cited by examiner

PROTON EXCHANGE MEMBRANE FUEL CELL

FIELD OF THE INVENTION

This invention relates to proton exchange membranes (PEM), more particularly to proton exchange membranes (PEM) used in the manufacture of fuel cells, even more particularly to nanocomposite proton exchange membranes used in the manufacture of fuel cells, typically proton exchange membrane fuel cells (PEMFCs).

DEFINITIONS

The following terms contained in this patent specification are defined as follows:

"carbon nanostructures" are allotropes of carbon having a bonding structure of $sp^2$ hybridized orbitals.

"carbon nanotube" or "CNT" a type of carbon nanostructure typically an elongated fullerene-like structure, also known as a buckytube, and includes single-walled carbon nanotubes, multi-walled carbon nanotubes, torus shaped carbon nanotubes, nanobuds and cup stacked carbon nanotubes.

"carbon nanoball" is a type of carbon nanostructure being of a substantially round shape.

"CNB" carbon nanoball
"DS" degree of sulphonation
"DSC" differential scanning calorimetry
"DTA" differential thermal analysis
"FTIR" Fourier transform infra-red
"IEC" ion exchange capacity
"PEMFC" proton exchange membrane fuel cell
"MEA" membrane electrode assembly
"NMR" nuclear magnetic resonance
"PEM" proton exchange membrane
"PSBR" polystyrene-butadiene rubber
"SPSBR" sulphonated polystyrene-butadiene rubber
"TGA" thermogravimetric analysis
"XRD" X-ray diffraction

BACKGROUND OF THE INVENTION

Proton exchange membrane fuel cells (PEMFCs) are known in the state of the art as a species of fuel cell wherein an electrochemical cell converts a source of fuel into electric current. Typically, electricity is generated inside a cell system resulting from reactions between a fuel source and an oxidant taking place in an electrolytic medium.

Typical hydrogen oxygen PEMFCs comprise a membrane electrode assembly (MEA) consisting of a proton conducting polymer membrane functioning as the electrolyte which separates an anode side from a cathode side. Hydrogen is introduced on the anode side where it comes into contact with a catalyst causing dissociation of the hydrogen into constituent protons and electrons. The protons then pass through the membrane to the cathode but the electrons cannot pass through the membrane and instead traverse an external circuit, generating electricity, to the cathode to bond with the protons and form water.

A membrane electrode assembly (MEA) is the heart of the fuel cell (Iyuke et al., 2003; Park et al., 2008), and consists of a sheet of proton-conducting polymer electrolyte membrane with two electrically and ionically conductive electrodes containing a platinum catalyst bonded to the opposite sides of the polymer membrane. The electric insular nature of the polymer membrane back bone and additional acid groups attached to the membrane are responsible for the ability of the membrane to prevent electrons from moving from an anode to a cathode.

Electrons produced as a result of electrochemical reactions and the general operation of single cell proton exchange membrane fuel cell (PEMFC) is presented in Equations 1-3 and FIG. 18.

FIG. 1 shows a typical membrane electrode assembly (MEA) arrangement for a single cell testing apparatus (Iyuke et al., 2003)

Cathode: $O_2 + 4H^+ + 4e^- \rightarrow 2H_2O$     (2)

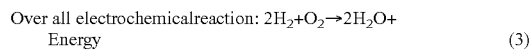

Over all electrochemical reaction: $2H_2 + O_2 \rightarrow 2H_2O +$ Energy     (3)

The electrons represented in Equations 1 travel from a reaction site in the anode through the diffusion layer to the reaction site in the cathode via an external circuit. The mechanism of movement of electrons through the diffusion layer involves collision of electrons with the molecules of the diffusion layer material and releases their energy to the molecule, which results in the excitation of the diffusion layer. The excited molecule then releases an electron which collides with another molecule, thereby facilitating electron flow. The membrane does not allow electrons to flow through, but the protons produced at the anode are transported across the membrane to the reaction sites in the cathode. The transport process of the protons is facilitated by interactions of the protons with one another as well as with the water molecules (which is the by-product of the electrochemical reaction in the fuel cell) in the MEA. The acid chain in the membrane does not contribute directly to the proton transport process, but maintains the structural integrity and electronic insulation of the membrane.

The positive potential established as a result of buildup of hydrogen at the anode-membrane interface is the initial force that is required to move the protons across the membrane. While the membrane serves the purpose as stated above, the electrodes perform three functions listed below (Wilson and Gottesfeld, 1992; Haynes, 2002; Mehta and Cooper, 2002):

1. They act as physical barriers between the gaseous stream and the solid electrolyte.
2. They supply a surface site where ionization and de-ionization of fuel and oxidant may occur.
3. They provide a porous interface between ions in the gaseous streams and the ion conducting electrolyte.

Disadvantages associated with current materials utilized as membranes in fuel cells include that they are expensive to manufacture and that the performance of the fuel cell is inadequate. The performance is influenced by various factors including the ability of the membrane to absorb water, thermal stability, porosity, solvent uptake, methanol crossover and proton conductivity.

There is a need for the development of a cost effective manufacturing process for PEMs which provides for a membrane which favourably effects at least one of the factors including: the ability of the membrane to absorb water, thermal stability, porosity, solvent uptake, methanol crossover and proton conductivity relative to the techniques comprising the current state of the art.

OBJECT OF THE INVENTION

The present invention, therefore, addresses the design and development of an alternative and cheaper proton exchange membrane (PEM) utilized in the manufacture of proton exchange membrane fuel cells (PEMFCs) which at least partly alleviates the disadvantages discussed above.

SUMMARY OF THE INVENTION

According to a first aspect of the invention, there is provided a proton exchange membrane, the proton exchange membrane comprising:
  a sulphonated polystyrene-butadiene rubber membrane having bonded therewith carbon nanostructures.

The proton exchange membrane wherein the carbon nanostructures are carbon nanoballs.

According to a second aspect of the invention, there is provided a membrane electrode assembly comprising:
  an electrolyte in the form of the proton exchange membrane according to the first aspect of the invention sandwiched between two ionically and electrically conductive electrodes, the two ionically and electrically conductive electrodes being an anode and a cathode.

The membrane electrode assembly wherein the ionically and electrically conductive electrodes are non-metallic electrodes, preferably carbon electrodes.

The membrane electrode assembly wherein the ionically and electrically conductive electrodes are metallic electrodes.

The membrane electrode assembly wherein the ionically and electrically conductive electrodes further comprise a catalyst, preferably a platinum catalyst, more preferably a carbon nanostructure-platinum catalyst, still more preferably a carbon nanotube-platinum catalyst.

The membrane electrode assembly wherein the anode and cathode are porous.

According to a third aspect of the invention, there is provided a proton exchange membrane fuel cell comprising:
  the membrane electrode assembly as described in the second aspect of the invention;
  an external electrical circuit, the external electrical circuit facilitating the flow of electrons from the anode to the cathode to generate electricity;
  a fuel source to provide the anode with fuel; and
  an oxidant source to provide the cathode with an oxidant, in use, fuel and an oxidant are introduced to the anode and cathode respectively, the fuel is oxidized to at least protons and electrons, the electrons flowing to the cathode via the external electrical circuit in so doing generating electricity, and the protons traversing the proton exchange membrane to the cathode, the electrons and protons at the cathode reducing an oxidant to form a by-product.

The proton exchange membrane fuel cell wherein the fuel source is hydrogen gas.

The proton exchange membrane fuel cell wherein the oxidant is oxygen gas.

The proton exchange membrane fuel cell wherein the byproduct is water.

The proton exchange membrane fuel cell further comprising a first and second diffusion layer, the first diffusion layer located adjacent the anode and the second diffusion layer located adjacent the cathode.

The proton exchange membrane fuel cell wherein the external circuit extends between the first and second diffusion layer facilitating flow of electrons from the anode through the first diffusion layer, through the external electrical circuit, through the second diffusion layer and to the cathode.

The proton exchange membrane fuel cell further comprising a first and second cooling means for temperature regulation of the proton exchange membrane fuel cell, the first cooling means located adjacent the first diffusion layer and the second cooling means located adjacent the second diffusion layer.

The proton exchange membrane fuel cell wherein the first and second cooling means are water cooling means, preferably comprising a conduit for conveying water flow.

According to a fourth aspect of the invention, there is provided a method of producing the proton exchange membrane according the first aspect of the invention, the method comprising polystyrene-butadiene rubber dissolved and reacted with a sulphur containing compound yielding a sulphonated polystyrene-butadiene rubber which is further dissolved and reacted with carbon nanostructures.

The method of producing the proton exchange membrane wherein the sulphur containing compound is chlorosulphonic acid and the carbon nanostructures are carbon nanoballs.

According to a fifth aspect of the invention there is provided for a method of producing the membrane electrode assembly according to the second aspect of the invention, the method comprising the proton exchange membrane according to the first aspect of the invention hot pressed between the two ionically and electrically conductive electrodes.

The method of producing the membrane electrode assembly wherein the proton exchange membrane hot pressed between the two ionically and electrically conductive electrodes at a temperature of about 100° C. and a pressure of about 1 196 447.23 pascal and for a time of about 3 minutes.

According to a sixth aspect of the invention there is provided for a method of producing a proton exchange membrane fuel cell according to the third aspect of the invention, the method comprising:
  connecting the external electrical circuit with the membrane electrode assembly as described in the second aspect of the invention so as to connect in electron flow communication the anode to the cathode;
  connecting the fuel source to be in fluid communication with the anode; and
  connecting the oxidant to be in fluid communication with the cathode, in use, fuel and an oxidant are introduced to the anode and cathode, the fuel is oxidized to at least protons and electrons, the electrons flowing to the cathode via the external circuit in so doing generating electricity, and the protons traversing the proton exchange membrane to the cathode, the electrons and protons at the cathode reducing the oxidant to form a by-product.

The method of producing a proton exchange membrane fuel cell further comprising connecting a first and second diffusion layer to the anode and cathode respectively such that the diffusion layers facilitate the passage of electrons.

The method of producing a proton exchange membrane fuel cell wherein water is the by-product to prevent flooding.

The method of producing a proton exchange membrane fuel cell further comprising connecting a first and second cooling means to the first and second diffusion layer such that the first and second cooling means are in heat exchange communication with the first and second diffusion layers.

According to a seventh aspect of the invention there is provided for use of carbon nanostructures in a method of producing a proton exchange membrane.

The use of carbon nanostructures in a method of producing a proton exchange membrane, wherein the carbon nanostructures are carbon nanoballs.

The use of carbon nanostructures in a method of producing a proton exchange membrane, wherein the method of producing a proton exchange membrane is the method described in the fourth aspect of the invention.

DESCRIPTION OF PREFERRED EMBODIMENTS

Figure 18:
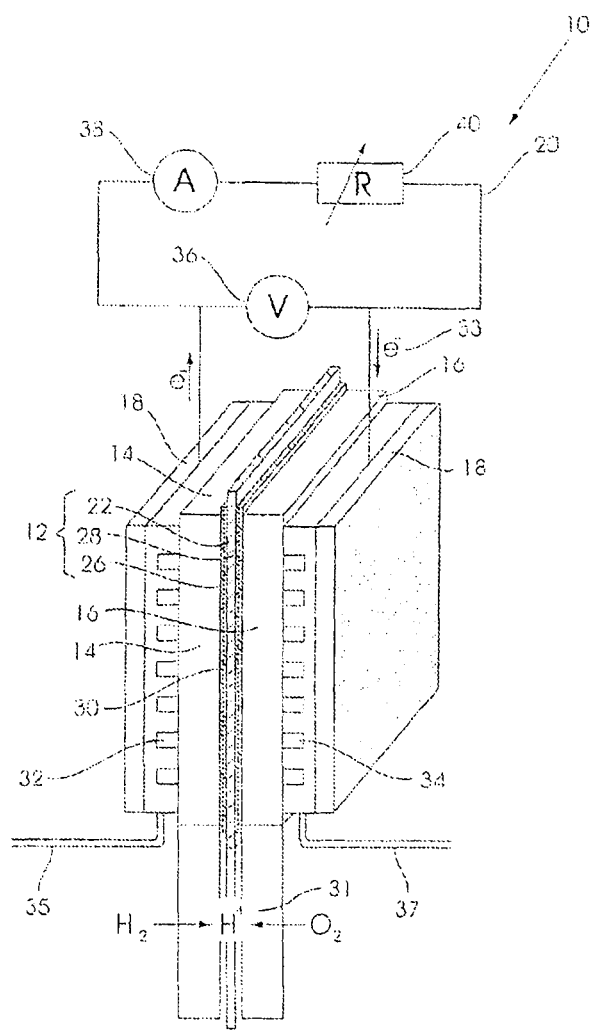
FIG. 18 shows a cross sectional side view of one embodiment of a proton electron membrane fuel cell (PEMFC) according to the present invention.

Referring to the accompanying diagrammatic drawing FIG. 18, a proton electron membrane fuel cell (PEMFC) 10 comprises a membrane electrode assembly (MEA) 12 having adjacent thereto a first and second diffusion layer 14, 16 each diffusion layer 14, 16 in heat exchange communication with a cooling means 18. The cooling means comprises a network of conduits for conveying water to act as a temperature regulation means for the PEMFC 10. Reactions occurring when the PEMFC 10 is in use are exothermic generating a certain amount of heat which needs to be dissipated to ensure optimum operational conditions and consequently the cooling means is necessary to provide for optimum temperature conditions. An external electrical circuit 20 connects the first and second diffusion layers 14, 16 providing for the first diffusion layer 14 to be in electron flow communication with the second diffusion layer 16 such that electricity is generate at the external electrical circuit 20 owing to the flow of electrons when the PEMFC is operational.

The MEA 12 comprises a solid polymer electrolyte 22 in the form of a sulphonated polystyrene-butadiene rubber-carbon nanoball nanocomposite membrane sandwiched between two ionically and electrically conductive porous electrodes 24, one anode 26 and one cathode 28, the electrodes 24 having a platinum-carbon nanotude catalyst 30 to catalyze chemical reactions taking place at the anode 26 and cathode 28 site during PEMFC 10 operational conditions. The solid polymer electrolyte 22 facilitates the trans-membrane transport of protons 31 and curbs electron 33 trans-membrane transport when the PEMFC 10 is operational.

The first diffusion layer 14 is operatively connected to a fuel source 32, the fuel being hydrogen gas, such that cathode 28 is in fluid communication via the first diffusion layer 14 with the hydrogen gas. The fuel source 32 has a gas inlet means 35 which is operatively connected to a gas line to supply fuel to the PEMFC 10. The second diffusion layer 16 is operatively connected to an oxidant 34, the oxidant being oxygen gas, such that the anode 26 is in fluid communication via the second diffusion layer 16 with the oxygen gas.

When the PEMFC 10 is in use hydrogen gas fuel is supplied to the first diffusion layer 14 thereby diffusing to the anode 26 coated with platinum-carbon nanotube catalyst 30. The catalyst 30 catalyses the oxidation reaction occurring at the anode 26 wherein the hydrogen fuel is oxidized to protons 31 and electrons 33. The proton 31 are then transported across the solid polymer electrolyte 22 functioning as a proton exchange membrane (PEM). The electrons 33 diffuse through the first diffusion layer 14 and through the external electrical circuit 20 where electricity is generated because of the flow of electrons 33. The external electrical circuit having a volt meter 36, an amp meter 38 and a resistor 40 for electrical properties to be measured. The electrons 33 then flow from the external electrical circuit 20 to the second diffusion layer 16 wherein they electrons 33 diffuse to make contact with the cathode 28. An oxidant 34 namely oxygen is supplied to the second diffusion layer 16 thereby diffusing to the cathode 28. The oxidant 34 has a gas inlet means 37 which is operatively connected to a gas line to supply oxidant to the PEMFC 10. Typically, the gas inlet means 35 and 37 have flow meters or variable pumps (not shown) to regulate the flow of gas to the PEMFC 10. When the electrons 33 come into contact with the protons 31 and the oxygen at the cathode 28, the oxygen is reduced to form water as a by-product.

By employing a sulphonated polystyrene-butadiene rubber-carbon nanoball (SPSBR-CNB) nanocomposite membrane as an electrolyte for a proton exchange membrane fuel cell (PEMFC) wherein the electrodes contain a platinum-carbon nanotube (Pt-CNT) catalyst the efficiency of existing PEMFCs common in the state of the art increases as at least one of the following factors is rendered more favourable: the ability of the membrane to absorb water, thermal stability, porosity, solvent uptake, methanol crossover and proton conductivity.

PREPARATION AND USE EXAMPLES

The proton exchange membrane (PEM) was synthesized from polystyrene-butadiene rubber (PSBR) grafted with sulphonic acid and carbon nanoballs (CNBs), while platinum was mono-dispersed on carbon nanotubes (CNTs) to produce electro catalytic electrodes with better performance than that which forms part of the current state of the art.

Figure 1:
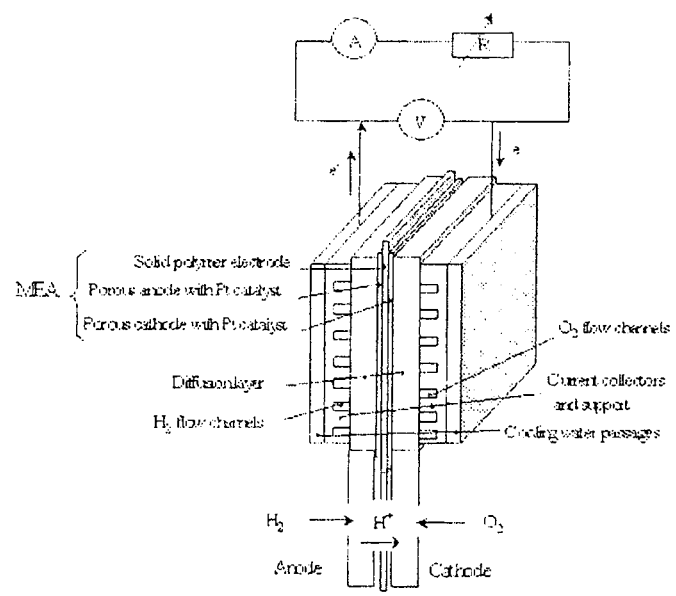
FIG. 1. shows a typical membrane electrode assembly (MEA) arrangement for a single cell testing apparatus (Iyuke et al., 2003).
Figure 2:
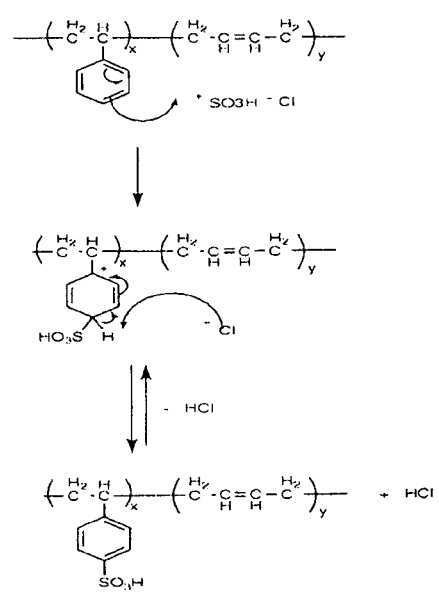
FIG. 2 shows the reaction mechanism of polystyrene-butadiene rubber in chlorosulphonic acid.

FIG. 2 shows the mechanistic sulphonation of the PSBR wherein the PSBR is reacted with chlorosulphonic acid. The first step of the reaction mechanism involves the electron rich aromatic ring reacting with the electrophile ($SO_3H$). This leads to the formation of a positively charged cyclohexadienyl cation, also referred to as the carbonium ion. The carbocation is always unstable due to the positive charge on the molecule and to the temporary loss of aromaticity. However, the cyclohexadienyl cation is partially stabilised by resonance, which allows the positive charge to be distributed over three carbon atoms.

The second stage of the reaction involves a kind of a lobe-HOMO Lewis base (Cl$^-$) reacting with hydrogen atom at the point of electrophilic attack, and the electrons shared by the hydrogen return to the $p_i$ system, thereby restoring the aromaticity of the styrene ring. Electrophilic substituents usually withdraw electrons from the aromatic ring and consequently deactivate it against further reaction. The extra electron density delivered into the ring by the substituent usually concentrates on the ortho and para positions of the aromatic ring. The highest electron density for benzene ring is seen to be located on both ortho positions, though increased reactivity might be offset by steric hindrance. However, a thorough sulphonation study carried out on polystyrene showed that the substituent ($SO_3H$) attached on the para position (Akovali and Ozkan, 1986). This could be due to steric effect hindrance on the ortho position since the ipso position on the aromatic ring is already occupied.

FIG. 2 shows a reaction mechanism of polystyrene-butadiene rubber in chlorosulphonic acid

1. EXPERIMENTAL METHODOLOGY 1.1 Sulphonation of polystyrene-butadiene rubber

Different weights (5, 10, 15, 20, 25 and 30 g) of polystyrene-butadiene rubber (PSBR) (Karbochem, South Africa) were dissolved in 250 ml of 1,2-dichloroethane (Analytical grade ≥98%: Merck South Africa). This was followed by gradual drop wise addition of 0.2-2.0 M of chlorosulphonic acid (Analytical grade ≥98%: Merck South Africa) into a chilled 1,2-dichloroethane solution (Analytical grade ≥98%: Merck South Africa) being vigorously stirred (250-1500 rpm). The reaction was performed in a four-neck round bottom flask reactor under argon atmosphere at different temperatures (22-75° C.). The sulphonation reaction was allowed to proceed for different sulphonation time (2-48 hours). The reaction was terminated by adding ethanol (Assay ≥98%: Merck South Africa) and the precipitated sulphonated polymer was recovered, washed with deionized water until the pH of wash reached values of 6-7. The product was then dried in an oven at 80° C. for 2-3 hours. The Sulphonated Polystyrene Butadiene Rubber (SPSBR) was characterized using Thermo gravimetric analysis (TGA), Differential scanning analysis, Elemental analysis, Capillary viscometer, FTIR and $^1$H-NMR.

1.2 Formulations of Sulphonated Polystyrene-Butadiene Rubber and Carbon Nanoballs Sulphonated polystyrene-butadiene rubber was synthesized at optimum operating conditions and blended with the carbon nanoballs. The optimal condition was based on the route that gives optimal degree of sulphonation, ion exchange capacity, thermal stability, water intake and swelling ratio with the least time, temperature and quantity of reagent used. 10 grams of sulphonated polystyrene-butadiene rubber was dissolved in 1,2-dichloro ethane. This was then followed by the dispersion of various masses of carbon nanoballs (0.1, 0.2, 0.3, 0.4 and 0.5 g) in 1,2-dichloro ethane. The mixture was stirred for a period of between 1-3 hours until the mixture became homogenous. The blended polymer was then cast and analyzed to determine the proton conductivity, thermal stability, water uptake, and morphology and methanol crossover.

1.3 Preparation of Pt/CNT Catalyst

A known quantity of the purified sample of carbon nanotubes (CNTs) produced was mixed with ethylene glycol and stirred for 4 hours during which a known concentration of potassium tetrachloro palatinate salt ($K_2PtCl_4$) was added to the mixture. The whole mixture was further vigorously stirred for 4 hours, filtered, dried at 120° C. and calcined at 300° C. for 16 hours. The resultant Pt/CNT catalyst was characterized using EDX, XRD, TEM and TGA.

1.4 Casting of SPSBR Membrane 10 g of SPSBR was dissolved in 200 ml of 1,2-dichloro ethane at elevated temperature to form a casting solution. The casting solution was then casted using a laboratory doctor blade casting machine. Prior to the casting, the doctor blade of the casting tape was set to a known thickness with the aid of feeler gauges of the appropriate thickness. The casting was done by pulling the casting head of the blade along the length of the paper, and cured for 4 days by exposing it to the air and then peeled off from the support. The casted membrane was then dried further in oven at 75° C. for 4-5 hours and finally vacuum dried for 4 hours to remove the residual solvent. The membrane was then analysed to determine the proton conductivity, water uptake, water desorption and swelling ratio.

1.5 Membrane Electrode Assembly

Prior to the membrane electrode assembly (MEA), the synthesized membrane both blended and unblended was treated to ensure that the membrane is completely in the protonic form and to remove any metal impurity in the membrane. The pre-treatment procedure include the boiling of the membrane in 3 wt % of hydrogen peroxide ($H_2O_2$) for one hour, followed by boiling in deionized water for one hour. The membrane was then boiled in 0.1M $H_2SO_4$ for 1 hour and finally boiled in deionized water for 1 hour to remove the excess acid deposited at the membrane surface. The MEA was then fabricated by sandwiching the synthesized membrane between two electrodes and then hot pressed at 100° C. for 3 minutes at a pressure of 173.53 Psi (1 196 447.23 pascal).

1.6 MEA Testing in a Single Fuel Cell Stack

The fuel gases (hydrogen and oxygen) were allowed to diffuse through the porous backing layer and diffused to the electrolyte/electrode interface where electro catalytic reaction takes place. While H$^+$ transport occurs through the electrolyte membrane, the electrons are transported through the external circuit. The single cell was installed in a fuel cell testing apparatus shown in Scheme 1 equipped with gas sources, temperature control, and gas flow-rate control rotameters, back pressure regulators for both hydrogen and oxygen, and a load of resistant box. Hydrogen and oxygen (Afrox, South Africa) were used in the fuel cell testing operations. Hydrogen was passed through a humidifier to wet the gas and fed into the anode at a flow rate of 712 ml/min and 20 kPa. Oxygen entered the fuel cell through the cathode at a flow rate of 433 ml/min and 15 kPa. The electrons generated from the anode were connected to a digital multimeter (1906 Competing Multimeter), with an external variable resistance to measure the current and voltage produced by the cell.

2. RESULTS AND DISCUSSION 2.1 Sulphonation of PSBR

PSBR is a copolymer of butadiene and styrene, which combines the thermoplastic and rubbery properties of both constituents, and is selected for sulphonation to produce proton exchange membrane (PEM). PSBR is one of the most versatile copolymer rubber compounds in the world today (Karbochem report, 2007) with high molecular weight, and due to its excellent abrasion resistance and under a well tailored degree of sulphonation, is expected to yield a PEM of good ion conductivity with low and acceptable methanol crossover suitable for fuel cell application. Preliminary investigation conducted on this rubber includes: solubility of the rubber in different solvents, effect of weight of rubber on the degree of sulphonation, choice of sulphonating agents and effect of stirring speed on the sulphonation reaction. Various factors such as effects of concentration of the sulphonating agent, sulphonation time and sulphonation temperatures were additionally investigated. The synthesized membrane was then blended with carbon nanoballs to produce SPSBR-CNBs nanocomposite membranes with the aim of improving its qualities for fuel cell applications. A preliminary investigation on the synthesis of PEM from PSBR revealed that both PSBR and SPSBR are soluble in dichloroethane. On the choice of sulphonating agents, results obtained show that PSBR has affinity for sulphuric acid, acetyl sulphate, mixture of fuming sulphuric acid and sulphuric and chlorosulphonic acids. Chlorosulphonic acid demonstrates the highest degree of sulphonation (DS) and ion exchange capacity (IEC). Therefore, chlorosulphonic acid is the sulphonating agent of choice.

The concentration effect of the sulphonating agent on the membrane was investigated wherein the acid concentration was varied between 0.2-2 M/ml and the results obtained show that IEC and DS increased with increase in the acid concentration until 1.6 M/ml after which the polymer was burnt due to high concentration of the acid, which led to a decrease in IEC and DS at 1.8 and 2.0 M/ml. The decrease in DS at higher concentration of acid (above 1.6 M/ml) can be attributed to the high viscosity of rubber which tends to reduce the affinity of rubber for the sulphonating agent. Higher concentration of acid also resulted in scission and chemical degradation of the polymer chain (Xing et al., 2004) as shown in FIG. 3.

The effect of the stirring speed on the sulphonation of PSBR was investigated using the Heidolph MR3002 dual plate machine and the results obtained are presented in Scheme 4. The dual plate is generally calibrated from 100-1500 rpm. The results obtained reveal that stirring speed is a vital factor on the sulphonation of PSBR as both degrees of sulphonation and ion exchange capacity increase with increase in stirring speed. The graph clearly shows that there is a linear increase of degree of sulphonation and ion exchange capacity as stirring speed increases until 1250 rpm before a very steep rise at 1500 rpm indicating that high stirring speed favours the sulphonation reaction of PSBR. The increase in DS and IEC as stirring speed increases could be due to increase in the rate of $SO_3H$ distribution to the phenyl ring. This encourages sulphonation reaction of PSBR to proceed in a desired direction and to maintain uniform distribution of $SO_3H$ group and thus discourages its local concentration that could lead to polymer chain scission. Therefore, a very high stirring speed of 1500 rpm is essential in the sulphonation of PSBR. The stirring speed could not be increased further after 1500 rpm due to mechanical constraints.

Figure 3:
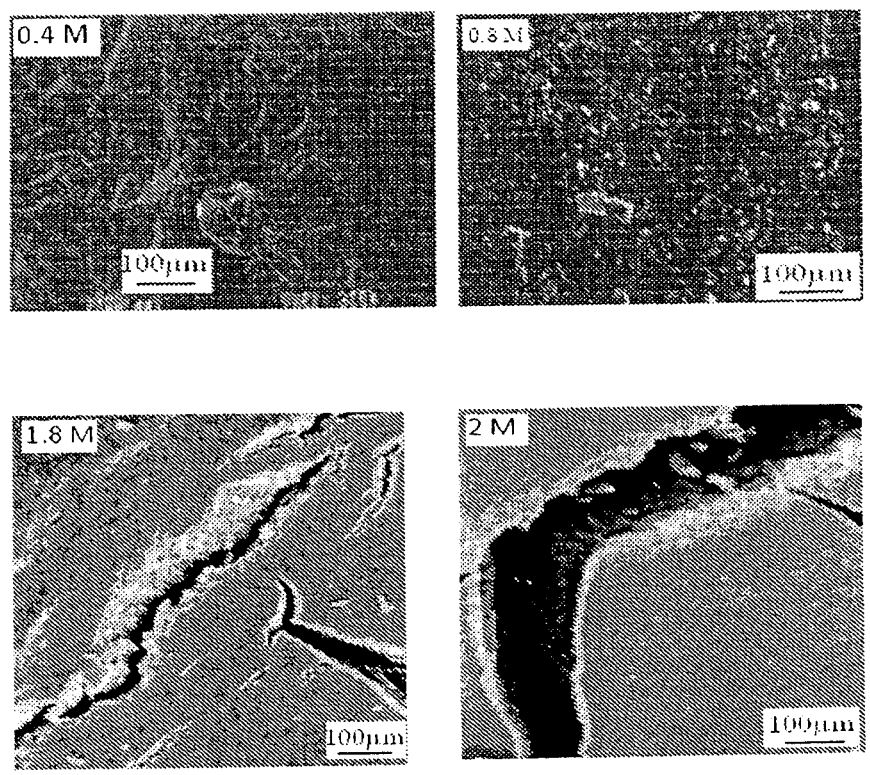
FIG. 3. Show the effects of acid concentration on the morphology of the membrane.
Figure 4:
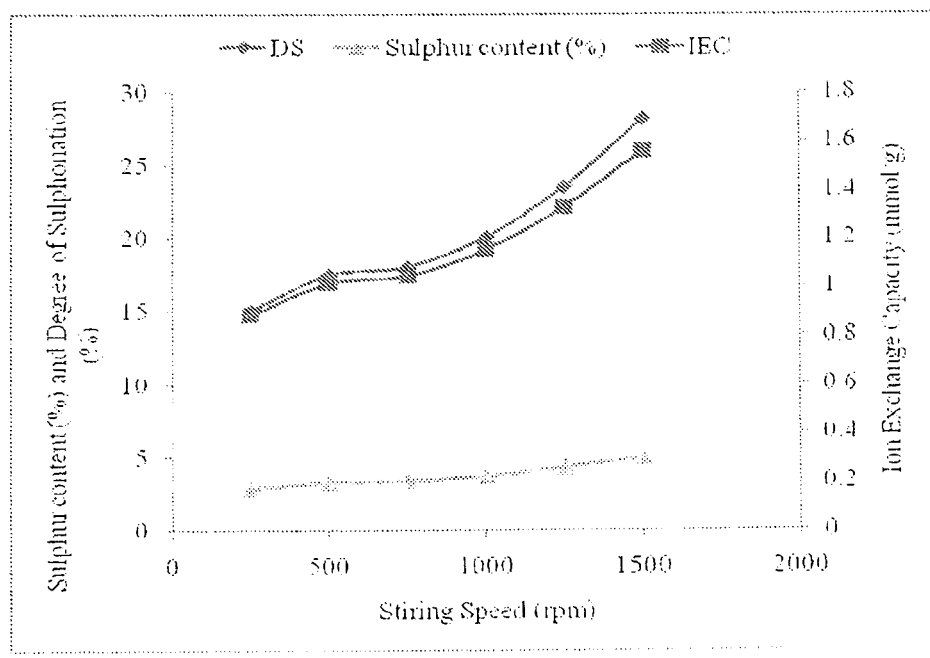
FIG. 4 shows the effect of stirring speed on sulphonation of PSBR.

FIG. 3 shows the effects of acid concentration on the morphology of the membrane FIG. 4 shows the effect of stirring speed on sulphonation of PSBR The effects of sulphonation time at a constant weight of polymer (10 g), concentration of acid (1.6 M/ml) and stirring speed of 1500 rpm on the sulphonation of PSBR were, therefore, used in further experiments as the optimum operating conditions. The result obtained shows that optimum time of sulphonation is needed during the sulphonation reaction of PSBR to achieve its optimum IEC and DS. The results obtained show an initial values of IEC and DS to be 0.784 mmol/g and 13.22% which increase with time of sulphonation with an optimum realization of IEC value of 2.074 mmol/g and DS value of 39.38% in 24 hrs. Above 24 hrs there is a steep decrease in both the IEC and DS values but progress slowly after 36 hours. This is an indication that prolong sulphonation time is unfavourable to PSBR which leads to possible breakdown of the polymer chain with reduction of available site of attachment for —$SO_3H$ group and hence decrease in the IEC and DS of the SPSBR.

A plot of IEC and DS at various temperatures is presented in Scheme 5a and b respectively. It can be observed from both figures that both the IEC and DS are influence by the sulphonation temperature. Therefore, the plot of DS as a function time at different temperatures as shown in FIG. 5b represent the sulphonation kinetics of polystyrene-butadiene rubber in chlorosulphonic acid. The sulphonation kinetics in chlorosulphonic acid was measured at four constant temperatures (22° C., 35° C., 55° C. and 75° C.).

Figure 5:
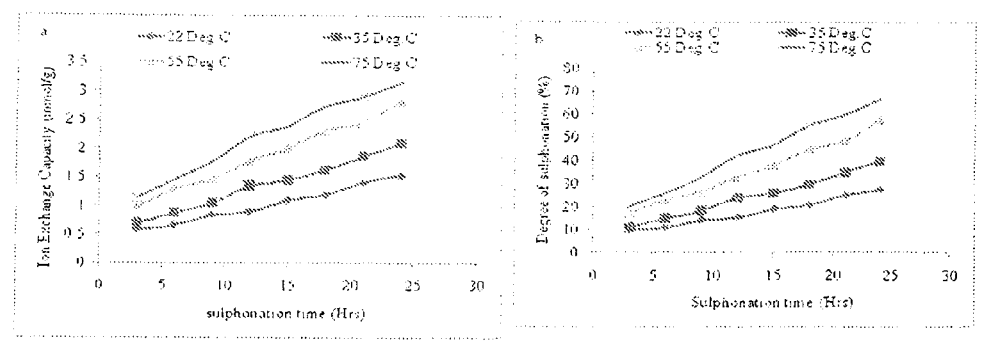
FIG. 5 shows the effects of temperature on the quality of the sulphonated rubber (a) ion exchange capacity (b) degree of sulphonation.

FIG. 5 shows the effects of temperature on the quality of the of the sulphonated rubber (a) ion exchange capacity (b) degree of sulphonation.

An increase in sulphonation temperature resulted in an increase in DS and IEC, but the synthesized PSBR with high DS was found to exhibit element of brittleness after casting into thin film. This could be associated with the plastic domain of the polymer as polystyrene often exhibits cross linking characteristics. But in a well tailored degree of sulphonation the brittleness is resolved; the brittleness reduces as DS increases until it is completely overcome. It is therefore inferred that increasing DS reduces the porosity and coarse nature of the starting polymer to a dense polymer material, and its mechanical property is correspondingly enhanced. At DS>2.5% membrane brittleness was completely overcome up to DS of 55% but the membrane showed signs of brittleness again at highest DS though with the highest level of ionic conductivity. Since PEM is required to balance the conductivity property with the mechanical properties, a membrane having DS>55% is considered unfit for proton exchange membrane fuel cell.

2.2 Blending of SPSBR with Carbon Nanoballs

Carbon nanoballs were used as proton conductive reinforcing material to produce SPSBR-CNBs nanocomposite membranes for proton exchange membranes. The morphology of the nanocomposite membranes at various masses of carbon nanoballs is presented in FIG. 6. It can be seen from the FIG. 6 that the CNBs are uniformly dispersed within the membrane, and as the mass of carbon nanoballs blended with the membrane increases, the denser the membrane. The uniform distribution of the CNBs on the membrane could be attributed to the electrostatic force of attraction between the sulphonic group and CNBs. The average particles diameters in the polymer-CNBs nanocomposite are in the ranges of 50-100 nm. The particle size of dispersed CNBs on the synthesized membrane increases with an increase in the mass of CNBs blended with the polymer membrane.

Figure 6:
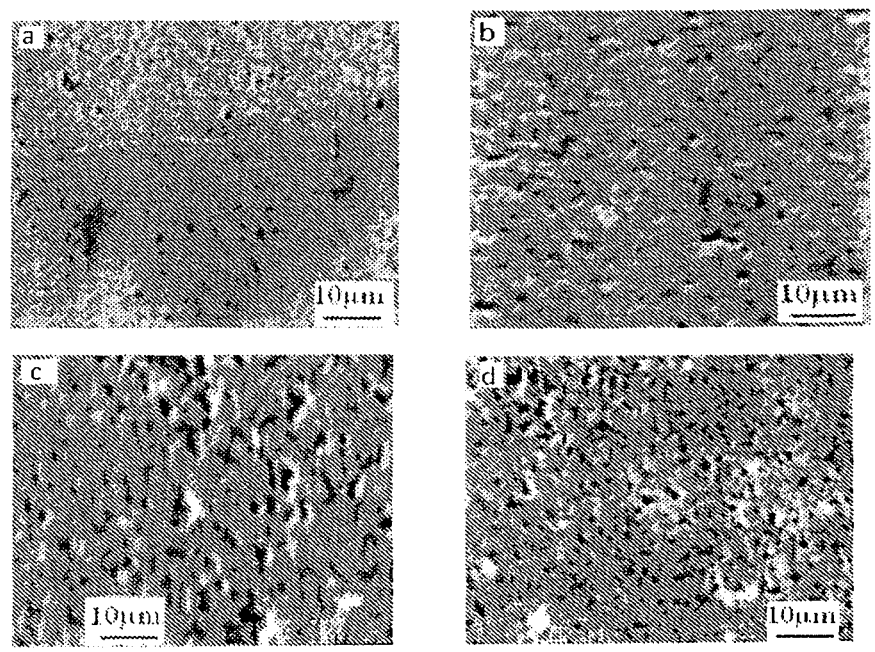
FIG. 6 shows the morphology of sulphonated polystyrene butadiene rubber blended with carbon nanoballs (a) mass of CNBs=0.1 g, (b) mass of CNBs=0.2 g, (c) mass of CNBs=0.3 g and (d) mass of CNBs=0.4 g.
Figure 7:
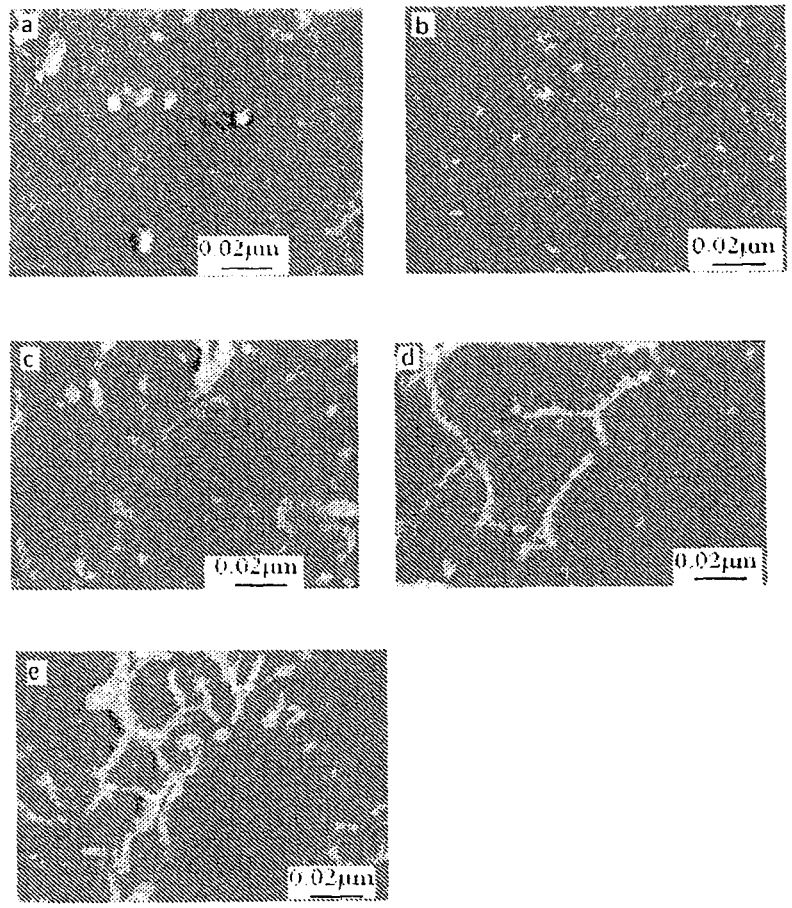
FIG. 7 shows SEM micrographs of the nanocomposites membrane (a) non-blended membrane (mass of CNBs=0 g) (b) mass of CNBs=0.1 g, (c) mass of CNBs=0.2 G (d) mass of CNBs=0.3 g and (e) mass of CNBs=0.4 g.

FIG. 6 shows the morphology of sulphonated polystyrene butadiene rubber blended with carbon nanoballs (a) mass of CNBs=0.1 g, (b) mass of CNBs=0.2 g, (c) mass of CNBs=0.3 g and (d) mass of CNBs=0.4 g In FIG. 7, the cross sectional micrograph of the prepared nanocomposite membranes are shown as a function of mass of CNBs. It can be seen from FIG. 7 that the CNBs were not only distributed on the surface of the sulphonated rubber, but also inside the membrane pores. The CNB particles were located in the polymer cluster because of the smaller size of the CNBs when compared to that of the polymer cluster.

Therefore the CNBs are entrapped in the polymer cluster which will result in increase in proton conducting property of the nanocomposite membrane. The charge passage through the percolated sponge like microstructure supplies the transport channels as shown in FIG. 7 (Haubold et al, 2001). The affinity of the $SO_3H$ group with the CNBs is further strengthened as the CNBs aggregated significantly with the $SO_3H$ group molecules thereby forming a networking ring, especially as the amount of CNBs used in the nanocomposite membranes increases. This is the phenomenon that will therefore improve the quality of the resulting membrane especially the ionic or proton conductivity.

FIG. 7 shows SEM micrographs of the nanocomposites membrane (a) non-blended membrane (mass of CNBs=0 g) (b) mass of CNBs=0.1 g, (c) mass of CNBs=0.2 g (d) mass of CNBs=0.3 g and (e) mass of CNBs=0.4 g)

3. MEMBRANE PROPERTIES

3.1 Thermal Stability

The major disadvantage in the use of Nafion®, which is the readily commercially available membrane in hydrogen fuel cell applications, is that it is unfavourable to employ in operating conditions in the range of 120-150° C. This factor limits the operating temperature of PEM fuel cell to about 80° C. The hydration of the Nafion® must be high enough to give the membrane sufficient conductivity, and limiting the operating temperature to 80° C. is to prevent the membrane from drying out. Differential scanning calorimeter (DSC), thermo gravimetric analysis (TGA) and differential thermal analysis (DTA) were used to analyze the thermal stability of the unsulphonated and sulphonated polystyrene butadiene rubber.

Because of the need for aqueous proton conductivity and the fact that Nafion® has relatively low glass transition temperature ($T_g \approx 110°$ C.) (Yang et al., 2004) when it is hydrated makes it difficult to operate fuel cells at high temperature as elucidated earlier. It is therefore important that the synthesized membrane has a higher glass transition temperature. The curves shown in Scheme 8 reveal that polystyrene-butadiene rubber is a highly thermo stable polymer with a glass transition temperature ($T_g$) of about 198° C. $T_g$ which is the temperature at which the polymer becomes brittle on cooling and soft on heating is taken as the point of inflexion on the slope change of DSC curve. This implies that the styrene group where the $SO_3H$ attached after sulphonation becomes weak and consequently results in degradation of the group from the main chain (Gu et al., 2006). DSC curves show that $T_g$ of the sulphonated membrane is in the range of 201-224° C. depending on the sulphonation time and degree of sulphonation. The final peak on the curve represents the final scission of the main chain of the membrane which is in the range of 360-363° C. for sulphonated and unsulphonated rubber.

Thermo gravimetric analysis (TGA) which determines change in weight relative to temperature was also employed to investigate the thermal stability of the unsulphonated and sulphonated rubber at different degree of sulphonation and sulphonation time. Three transition of loss in weight in three ranges of temperature can be observed in the TGA curves for both unsulphonated and sulphonated rubber. For unsulphonated rubber, the first transition is in the range of 23.79° C.-219.51° C. as shown in Scheme 9a can be attributed to the presence of moisture and some other additives used in the production of polystyrene-butadiene rubber. It can be observed from the TGA curves that drop in weight at these temperature ranges reduce as the degree of sulphonation increases and this is an indication that the attached $SO_3H$ group improved the strength of the rubber. The second drop in weight in the range of 219.51° C.-302.97° C. represents the thermal degradation of the styrene group attached to the butadiene which is the main chain. While the third transition in the range of 302.97° C.-366° C. is ascribed to the thermal degradation of the main chain. It was also observed during the pretreatment of the samples in the presence of air that the sulphonated rubber does not undergo oxidation as the weight remains constant.

Figure 8:
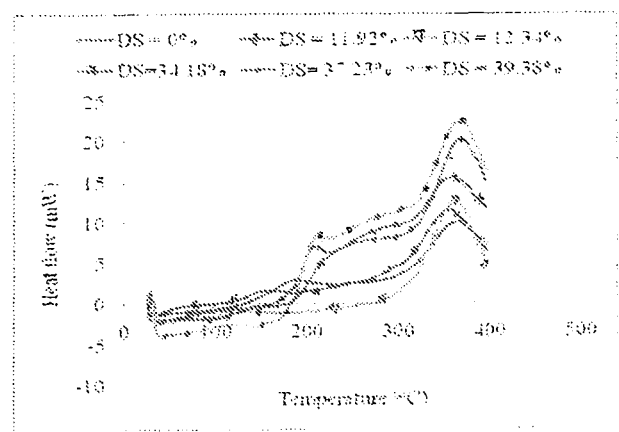
FIG. 8 shows DSC curves of the unsulphonated and sulphonated rubber at different degree of sulphonation.
Figure 9:
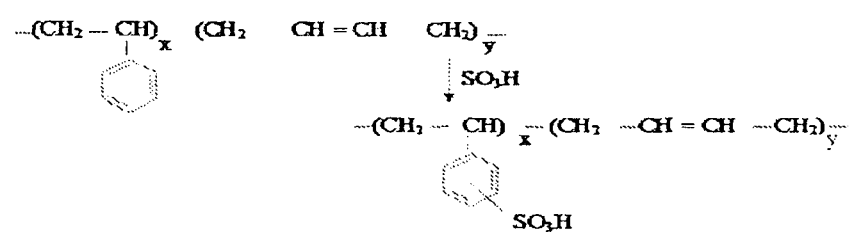
FIG. 9 shows sulphonation of polystyrene butadiene rubber.

FIG. 8 shows DSC curves of the unsulphonated and sulphonated rubber at different degree of sulphonation In the case of the sulphonated rubber the second weight loss step was in the region of 306.9° C.-412° C. (depending on the degree of sulphonation) which is typically associated with the loss of styrene-sulphonic group. While the third weight loss step in the range of 402.9° C.-475.52° C. representing the decomposition of the main chain. It could be noticed from FIG. 8 that the scission temperature of styrene-sulphonic acid increases with increase in degree of sulphonation and it is higher than that of the unsulphonated rubber. This result contradicts the results of Gao and co-worker (2003), such that in their case the sulphonic acid degradation temperature reduces with increase in degree of sulphonation. The difference can be attributed to the fact that the base polymer used is composed of two monomers i.e. styrene (25%) and butadiene (75%) (Karbochem report). The $SO_3H$ group is directly attached to the styrene group after sulphonation as shown in FIG. 9, thereby contributing to the strengthening of the bond between the styrene and butadiene. The higher degree of sulphonation implies higher number of sulphonic groups attached to the styrene and consequently improves the strength of the polymer.

FIG. 9 shows sulphonation of polystyrene butadiene rubber

Results on the thermal stability of the rubber from the TGA curves also show that as the DS increases, the sulphonated rubber loses weight faster in the range of 306° C.-410° C. depending on DS. This situation was attributed to the elimination of residual $SO_3H$ group (Gao et al., 2003). FIG. 10b shows the TGA profiles of the synthesized membrane and the membrane modified with CNBs. The improvement in the thermal stability of the nanocomposite membranes as presented in FIG. 10b can be attributed to the rigid electrostatic force of attraction between the $SO_3H$ and network of CNBs in the nanocomposite. Results revealed that the mass of CNBs blended with the membrane is a contributing factor to improving thermal stability of the membrane synthesized from PSBR. It can be observed from the TGA profile shown in FIG. 10A that the second weight loss step which represents the loss of styrene group is in the range of 341° C.-464° C. which increases with increase in the mass of CNBs as compared to temperature range of around 306.9° C.-412° C. for non blended membrane. The third weight loss step is in the range of 475.25° C.-554.72° C. representing the decomposition of the main chain, which also increases with increase in mass of CNBs in the nanocomposite membranes.

Figure 10:
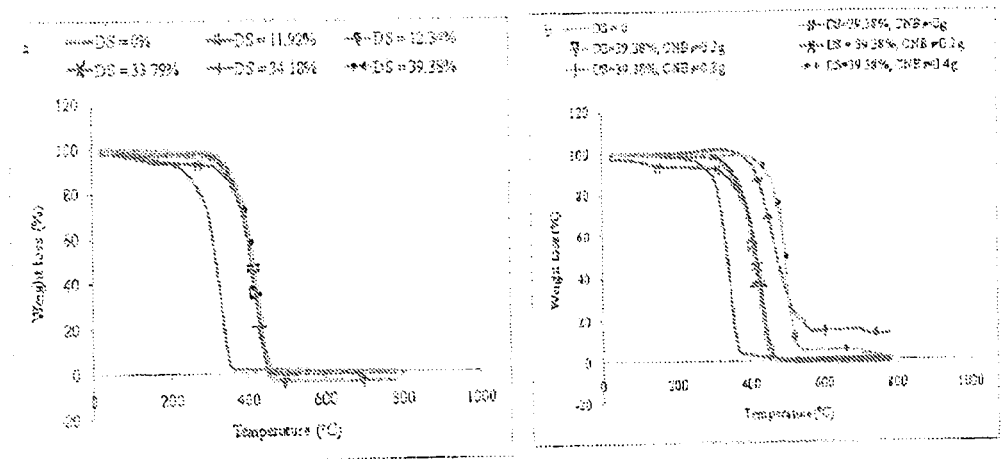
FIG. 10 shows polystyrene butadiene rubber (a) TGA curve of the unsulphonated and sulphonated rubber at different degree of sulphonation (b) TGA profiles of the SPSBR/CNBs nanocomposite membranes at different mass of blended CNBs.

FIG. 10 shows polystyrene butadiene rubber (a) TGA curve of the unsulphonated and sulphonated rubber at different degree of sulphonation (b) TGA profiles of the SPSBR/CNBs nanocomposite membranes at different mass of blended CNBs

3.2 Water Uptake

Water uptake is the weight percent of water absorbed by the SPSBR membrane with respect to the weight of dry membrane (Sangeetha, 2005). Water molecules are necessary in the membrane because it provides the medium for the movement of ions, but excess up take of water can result in swelling of the membrane and consequently affects the mechanical and conductivity properties. Results obtained on the water uptake at different degree of sulphonation are shown in FIG. 11a. The degree of sulphonation (arising from the ion exchange capacity of the membrane) and water uptake contribute to the proton transport through the dense membrane (Basile et al., 2006). Better water uptake facilitates better proton conductivity of the membrane (Constamagna and Srinivasan, 2001). In sulphonic acid based membrane, the proton conductivity depends on the number of available acid groups best expressed as degree of sulphonation and water contents in the membrane (Mokrini et al., 2006). Therefore, the higher the degree of sulphonation, the better the ability of the membrane to absorb water and causes proton dissociation and mobility. It is therefore, important to note that proton conduction in sulphonic acid membranes is due to proton hopping from one sulphonic group to another (Grothus mechanism) (Mahreni et al., 2009). In the presence of water, both the proton and the sulphonic groups are in the solvated form which is known to facilitate the hopping mechanism, for instance a specific conductivity of about 0.1 S/cm has been reported for a fully hydrated Nafion membrane at 80° C. (Costamagna and Srinivasan, 2001). Thus maximum water uptake by the electrolyte membrane is vital for a proton exchange membrane fuel cell to attain its highest performance (Costamagna and Srinivasan, 2001).

FIG. 11b shows the dependence of the water uptake by the nanocomposite on the amount of CNBs blended with the sulphonated polystyrene-butadiene rubber. Results indicated that the water uptake of the nanocomposite membrane is influenced by the amount of CNBs blended with the polymer. Results also show that the water uptake of the nanocomposite membrane is better than that of the membrane without carbon nanoballs. The weight percentage of the water uptake by the nanocomposite membrane increases with an increase in the CNBs ratio in the polymer matrix. The increase in the water uptake of the blended membrane can be attributed to the water retention ability of the CNBs.

Figure 11:
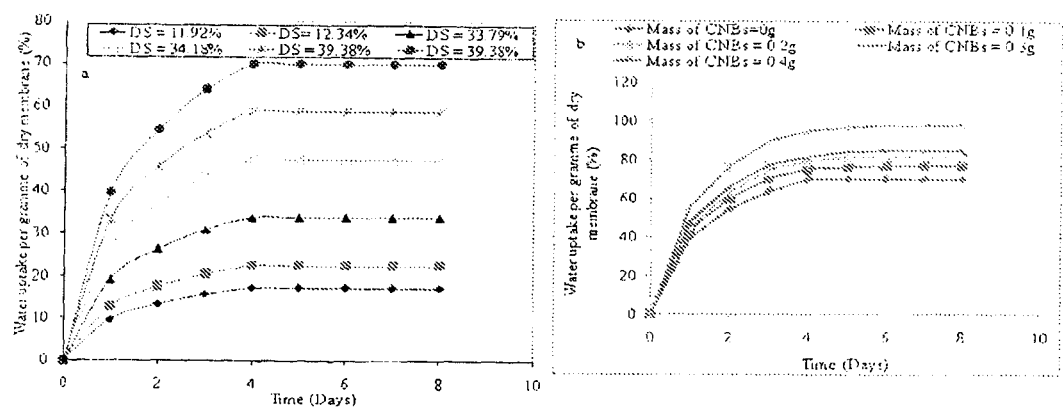
FIG. 11 shows water uptake (a) at different degree of sulphonation (b) at different weights of nanoballs in the nanocomposite membranes.

FIG. 11 shows water uptake (a) at different degree, of sulphonation (b) at different weights, of nanoballs in the nanocomposite membranes 3.3 Proton Conductivity Proton conductivity of the synthesized membranes was measured at different temperatures and membrane thicknesses. Prior to the measurement, the membrane samples were soaked in distilled-water for hydration. A well hydrated membrane is required to achieve a desirable level of conductivity especially for a membrane that relies on sulphonic acid to conduct protons (Sangeetha, 2005).

FIG. 12a shows the membrane thickness dependence on proton conductivity of the membrane at different DS. The conductivity of the membrane increases with an increase in DS and is inversely proportional to the membrane thickness. For instance, membrane with the DS of 39.38% exhibits conductivity of $1.58 \times 10^{-2}$ and $9.38 \times 10^{-3}$ S/cm at membrane thickness of 170 μm and 450 μm respectively. It was reported that highly conducting membrane tends to be weak mechanically, and are often reinforced by a non conducting cloth or other similar structure (Chen et al., 2005; Mokirim et al., 2006; Anilkumer et al., 2006; Jiang et al., 2006). Therefore, the thinnest membrane will produce lowest internal resistance, but the thickness must be high enough so that the molecular diffusion of gases is slow and the membrane is strong enough for fuel cell applications. Otherwise poor current efficiency and waste of fuel gas by diffusion occur during especially long running periods.

FIG. 12b shows the proton conductivity of the synthesized SPSBR-CNBs nanocomposite membrane at different thicknesses as a function of CNB mass in the nanocomposite. As shown it can be seen that the proton conductivity of the unblended membrane is lower than those blended with CNBs. The increment in the proton conductivity of the blended membrane could be attributed to the ionic cluster of CNBs around the $SO_3H$ group in the synthesized membrane. Therefore, blending of the membrane with CNBs is of high importance to the performance of the membrane. Increase in proton conductivity of the blended membrane can be attributed to excellent water uptake due to the presence of CNBs when compared to that of unblended membrane. The presence of CNBs in the nanocomposite membrane form the hydration shells around the fixed covalently bonded sulphonic group which aid water uptake capacity of the composite membrane (Haubold et al, 2001). For instance, the proton conductivity of the unblended membrane with thickness of 200 μm is $1.3 \times 10^{-2}$ S/cm. While those of the blended membranes with same thickness are in the range of $1.47 \times 10^{-2}$-$2.0 \times 10^{-2}$ S/cm, these values increase with increase in mass of CNBs in the nanocomposite membrane.

As shown in FIG. 12b the CNBs substantially improve the transport of protons through the nanocomposite membrane. The CNBs particle size and the stability of the CNBs particles in the polymer matrix greatly influences the conducting properties of the nanocomposite membrane. It is therefore important that the CNB particle size be equal or less than equal to the ionic cluster size in the polymer membrane matrix. These particles serve as proton hopping bridge, which is responsible for the proton conducting properties of the nanocomposite membrane.

Figure 12:
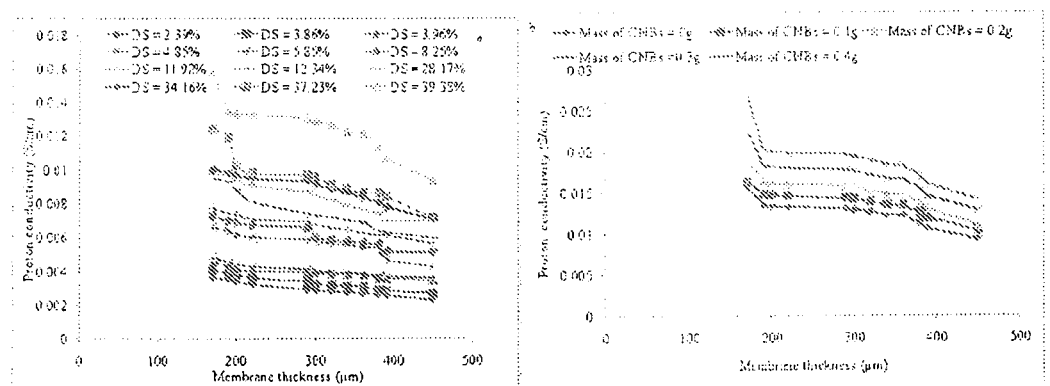
FIG. 12 shows proton conductivity as a result (a) of effect of membrane thickness and different degree of sulphonation (b) of effect of CNBs and different membrane thickness.

FIG. 12 shows proton conductivity as a result (a) of effect of membrane thickness and different degree of sulphonation. (b) of effect of CNBs and different membrane thickness.

A proposed reaction mechanism between the polystyrene-butadiene rubber, chlorosulphonic acid and CNBs are presented in FIGS. 13 and 14 below:

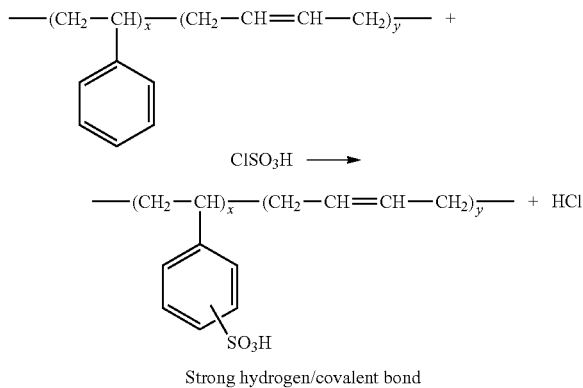

Scheme 13: Sulphonation of polystyrene butadiene rubber

Figure 13:
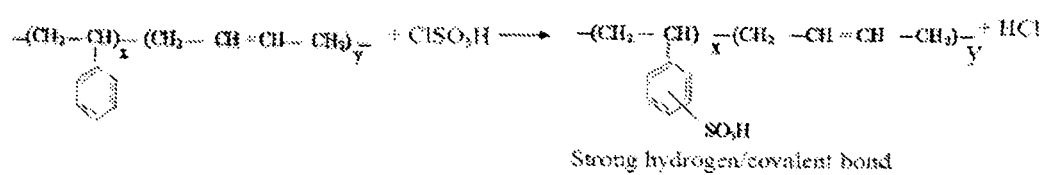
FIG. 13 shows sulphonation of polystyrene butadiene rubber.

FIG. 13 shows sulphonation of polystyrene butadiene rubber

Figure 14:
FIG. 14 shows blending of sulphonated polystyrene butadiene rubber with CNBs.

FIG. 14 shows blending of sulphonated polystyrene butadiene rubber with CNBs

It can be proposed from FIGS. 13 and 14 that nanocomposite structure of sulphonated polystyrene-butadiene rubber and carbon nanoballs possess a strong hydrogen bonding between the para position of the repeating unit and the $SO_3H$ group (Idibie, 2009). This strong hydrogen bond leads to attachment of the $SO_3H$ group to the styrene and electrostatic force of attraction between the SO$_3$H and CNBs makes it possible for the nanoparticles to blend well with the sulphonated rubber.

3.4 Methanol Crossover

Effects of DS on the measure of overall diffusion coefficients of the synthesized membrane at different membrane thickness are presented in Table 1. Results obtained show that the synthesized membrane from polystyrene-butadiene rubber exhibited lower methanol diffusion coefficient when compared with Nafion® 117 (3.42×10$^{-6}$ cm$^2$/s) (Shen et al., 2005). Comparing the overall diffusion coefficient with DS of the synthesized membrane, it could be observed that the membrane with lower DS has a larger methanol overall diffusion coefficient than membrane with the higher DS.

TABLE 1

Overall diffusion coefficient of the membrane at different thickness and degree of sulphonation

| DS (%) | Overall diffusion coefficient (cm$^2$/s) × 10$^{-7}$ Membrane thickness (μm) | | | | | |
|---|---|---|---|---|---|---|
| | 112 | 115 | 117 | 220 | 350 | 420 |
| 3.86 | 3.45 | 3.42 | 3.41 | 4.51 | 5.37 | 5.12 |
| 5.89 | 3.33 | 3.31 | 3.29 | 4.36 | 5.19 | 4.96 |
| 15.39 | 2.62 | 2.61 | 2.60 | 3.46 | 4.12 | 4.32 |
| 29.45 | 2.57 | 2.55 | 2.54 | 3.39 | 4.04 | 4.23 |
| 39.38 | 2.19 | 2.18 | 2.17 | 2.9 | 3.46 | 3.63 |

Table 2 shows the effects of CNBs on the methanol permeability of the nanocomposite membranes. Results obtained indicate that as the mass of CNBs increases, the methanol permeability of the nanocomposite membranes decreases. This is an indication that blending of CNBs with membrane will influence the performance of the membrane in fuel cell application. Factor (φ) known as characteristic factor was also used to justify the performance of the nanocomposite membranes in fuel cell.

TABLE 2

Characteristic factor of the nanocomposite membranes

| Mass of CNBs (g) | Proton conductivity (S/cm) | Methanol permeability × 10$^{-7}$ (mol/cm$^2$s) | Characteristic factor |
|---|---|---|---|
| 0 | 0.013275 | 7.329 | 18.11 |
| 0.1 | 0.014602 | 6.172 | 23.66 |
| 0.2 | 0.016062 | 5.685 | 28.25 |
| 0.3 | 0.018093 | 5.004 | 36.16 |
| 0.4 | 0.019912 | 4.124 | 48.29 |

The characteristic factor (φ) which is the ratio of proton conductivity to the methanol permeability of the membrane is an effective parameter to justify the membrane performance. The decrease in the methanol permeability in the presence of high ionic conductivity should improve the cell efficiency and power density. The characteristic factor (φ) of the nanocomposite membranes was calculated using equation 4 (Fang et al., 2007)

$$\Phi = \frac{\sigma}{P} \qquad (4)$$

Where φ=characteristic factor, σ=proton conductivity (S/cm) and, P=methanol permeability of the membrane (mmol/cm$^2$ s).

Results as presented in Table 2 for the blended membrane indicated that CNBs effect the quality of the synthesized membrane. The values obtained increases as the mass of the CNBs in the nanocomposite membranes increase, this could be attributed to the influence of the CNBs on the proton conductivity and methanol permeability of the synthesized nanocomposite membrane. Characteristic factors (φ) of Nafion 117 is 8 and that of Nafion 115 is 3 (Fang et al., 2007) much lower than that of the synthesized membrane. The higher the characteristic values (φ), the better the performance of the membrane (Bae et al., 2003). It is clear that the characteristic factors of the synthesized nanocomposite membranes as shown in Table 2 (18-48) are much higher than that of the Nafion®, indicating that the performance of the synthesized membrane in a fuel cell application would be superior to that of Nafion®.

4. MEA FABRICATION AND TESTING

A single stack PEM fuel cell's performance is one of the main evaluation means for the viability of particular a fuel cell technology. During the fuel cell operation, the single stack cell was operated at room temperature (about 25° C.), with humidified hydrogen at flow rate of 712 ml/min and pressure of 20 kPa through the anode. The humidified oxygen entered the stack through the cathode at a flow rate of 433 ml/min and 15 kPa. The membrane electrode assembly (MEA) used in the fuel cell stack was fabricated by sandwiching the synthesized membrane between two electrodes and then hot pressing at 100° C. for 3 minutes at a pressure of 173.53 Psi (1 196 447.23 pascal). Electrodes used in this work were prepared by impregnation of platinum on carbon nanotubes at varying loadings of platinum on fixed amount of carbon nanotubes (Afolabi, 2009). This was to investigate the influence of the platinum loading on catalyst on the performance of MEA in the fuel cell stack. Prior to the use of fabricated MEA in a fuel cell stack, the MEA was fully hydrated in water, since poor humidification resulted in lower ionic conductivity. It was also observed during the experiment that humidification of gases greatly influenced the performance of the cell. Therefore, hydration of the membrane and humidification of the gases were done to enhance transfer of protons from the anode side to the cathode side. Typically, the humidification temperature is equal to the cell temperature (room temperature). In order to understand the effects of degree of sulphonation on membrane performance, MEAs were prepared by using membranes with different degrees of sulphonation. During the performance measurement, the testing system was stabilized for more than one hour in order to obtain constant value of all the parameters of interest.

Figure 15:
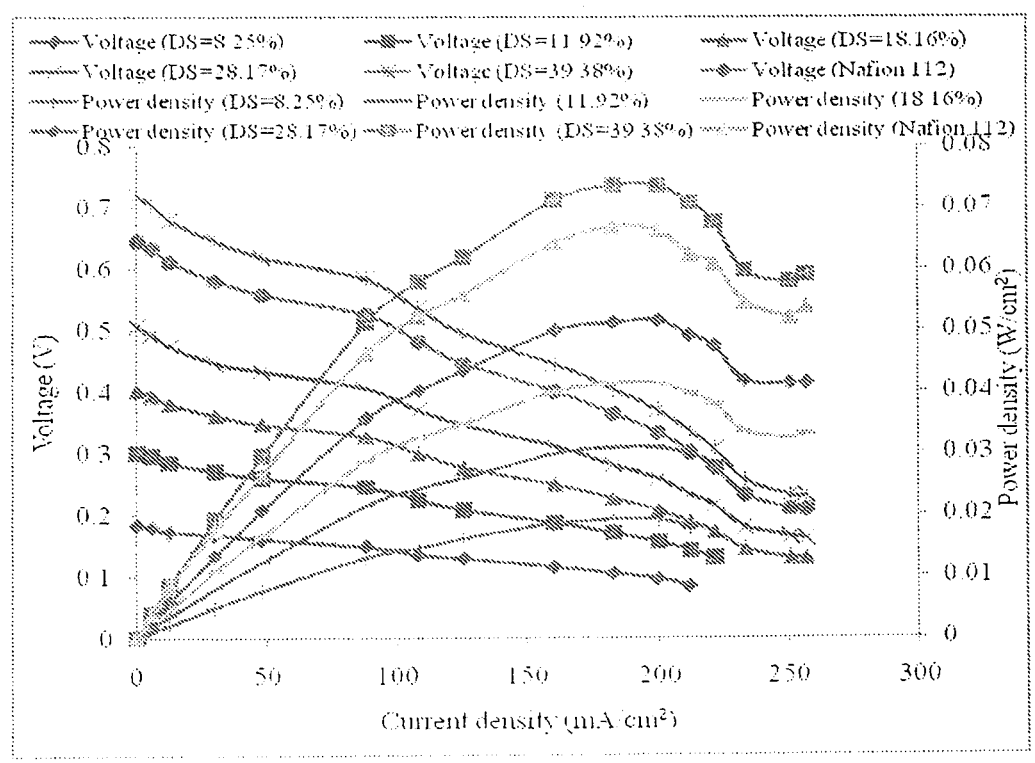
FIG. 15 shows the effect of degree of sulphonation on the performance of SPSBR based MEAs.

The test results obtained in single cell stack at different degree of sulphonation and 40 Pt wt % catalyst electrodes are displayed in FIG. 15. It was not surprising that an increase in the degree of sulphonation resulted in higher performance of the MEA, since increase in degree of sulphonation resulted in increase in sulphonic acid groups in the membrane matrix which in turn facilitates the proton transfer ability of the membrane. The higher the proton transfer the higher the voltage generated and the better the power density produced. For instance, when the degree of sulphonation is equal to 8.23% the maximum power density produced by the membrane is approximately 0.0192 W/cm$^2$, while at higher degree of sulphonation (DS=39.38%), the power density produced by the membrane is approximately equal to 0.0737 W/cm$^2$.

FIG. 15 shows the effect of degree of sulphonation on the performance of SPSBR based MEAs.

The effect of using different loadings of catalyst on the electrodes to analyze the performance of the nanocomposite membranes in the single cell stack was explored. The results obtained when membranes of a constant degree, of sulphonation and varying weight of catalyst are presented in FIG. 16.

Figure 16:
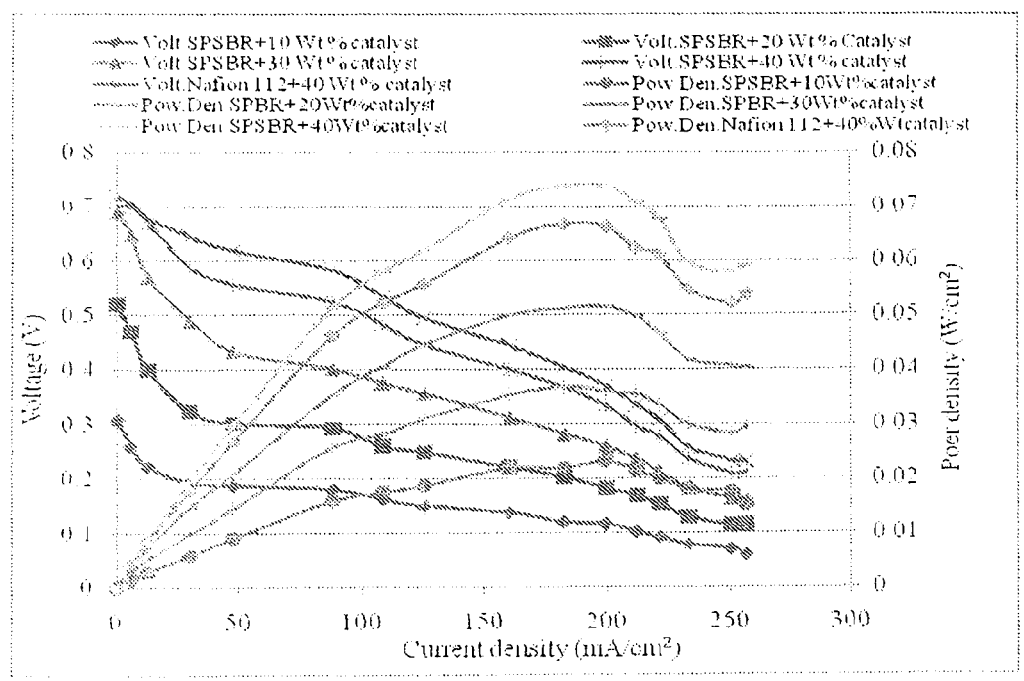
FIG. 16 shows the effect of catalyst loading on the performance of SPSBR and Nation 122 based MEAs.

Nafion 112 is used to compare the performance of the membrane synthesized from polystyrene butadiene rubber as shown in FIG. 16. The comparisons of the membranes' performance were made directly on the corresponding polarization curve. As seen in FIG. 16, the weight of catalyst influenced the performance of the synthesized membrane in fuel cell stack. Results revealed that as the weight of catalyst increases, the performance of the membrane also increased. This is because the increment in weight of catalyst resulted in favourable surface for the electrochemical reaction in the fuel cell stack to take place at, which in turns lead to generation of voltage, but care must be taken to prevent short circuiting of the stack. The comparison of the two MEAs prepared by sulphonated polystyrene-butadiene rubber and Nafion 112 are also given in FIG. 16.

It is apparent that the use of sulphonated polystyrene-butadiene rubber resulted in higher performance at constant 40% weight of catalyst. Nafion 112 produced maximum power density of 0.0669 W/cm$^2$ while the use of membrane synthesized from PSBR resulted in maximum power density of 0.0737 W/cm$^2$. This difference is corresponding to about 10.16% improvement in power density.

The improvement of the membrane blended with carbon nanoballs (SPSBR-CNBs nanocomposite membrane) has been shown above through the various analysis conducted on the nanocomposite membrane and non-blended membranes.

FIG. 16 shows the effect of catalyst loading on the performance of SPSBR and Nafion 122 based MEAs.

Figure 17:
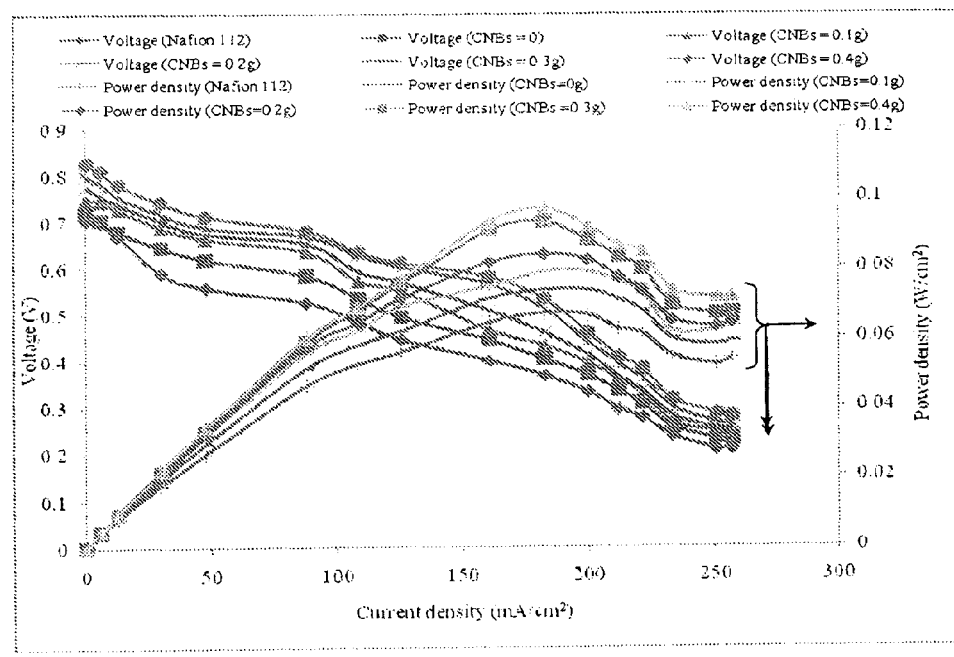
FIG. 17 shows the influence of CNBs on the performance of the SPSBR based MEAs.

FIG. 17 shows clearly that the membranes blended with CNBs exhibit a superior performance to a non-blended membrane. The former gives a maximum power density in the range of 0.0737-0.0971 W/cm$^2$ depending on the mass of CNBs, which is about 6.9-31.75% higher than the latter as shown in Table 3. The better performance of the blended nanocomposite membrane can be attributed to the hydrophilic properties of carbon nanoballs, which contribute to proton conductivity of the nanocomposite membranes. Therefore, the use of CNBs as proton conducting fillers enhances the global proton conductivity of the nanocomposite membranes.

FIG. 17 shows the influence of CNBs on the performance of the SPSBR based MEAs

TABLE 3

Effects of mass of CNBs on the performance of SPSBR based MEAs

| Mass of CNBs (g) | Maximum power density (W/cm$^2$) | Percentage increase (%) |
|---|---|---|
| 0 | 0.074 | |
| 0.1 | 0.079 | 6.92 |
| 0.2 | 0.0834 | 13.84 |
| 0.3 | 0.093 | 26.32 |
| 0.4 | 0.097 | 31.75 |

5. CONCLUSION

The chemical modification of a polystyrene-butadiene rubber (PSBR) to serve as an efficient and novel alternative to Nafion® for proton exchange membrane fuel cell is possible. This involves a careful controlled sulphonation with a well tailored degree of sulphonation in the range of 2.39-39.38%. Results obtained showed that concentration of sulphonating agent, sulphonation time, stirring speed, weight of the polymer and sulphonation temperature affects the qualities of the membranes synthesized. Blending of the synthesized membrane with carbon nanoballs greatly influence the qualities of the membrane. Results obtained revealed that blending of the membrane with CNBs significantly improved the thermal stability, water uptake, porosity, solvent uptake, methanol crossover and proton conductivity of the membrane with more than 50% increase as compared to none blended membrane. Results of various analysis conducted also revealed that the synthesized membrane shows better qualities than the commercial Nafion 112. The blended nanocomposite and non-blended membranes were sandwiched between two electrodes to produce MEA using hot press method at constant condition of temperature, pressure and time. The performance of the fabricated MEA was tested in a single PEM fuel cell using hydrogen as the fuel gas and oxygen as oxidant at room temperature (about 25° C.). Results obtained revealed that utilization of sulphonated PSBR resulted in higher performance compared to Nafion 112. Nafion 112 produced maximum power density of 0.0669 W/cm$^2$ while the membrane synthesized from PSBR generated maximum power density of 0.0737 W/cm$^2$. This difference is corresponding to about 10.16% increment. The membrane blended with CNBs exhibit a superior performance to none blended membrane. The former gives a maximum power density in the range of 0.0737-0.0971 W/cm$^2$ depending on the mass of CNBs. These values are about 6.9-31.75% higher than non-blended membrane.

REFERENCES

Afolabi A. S (2009): Development of carbon nanotubes platinum electro catalytic electrodes for proton exchange membrane fuel cell. PhD thesis, University of the Witwatersrand, Johannesburg, South Africa. Unpublished.

Alkovali. C and Ozkan. A (1986): Notes on modification of polystyrene by sulphonation; some properties of poly (styrene sulphonic acid). Polymer, Volume 27. Pp 1227-1280

Anikumer. G. M., Nakazawa. S., Okubo. T and Yamaguchi. T (2006): Proton conducting phosphated zirconia-sulfonated polyether sulfone nano hybrid electrolyte for low humidity, wide-temperature PEMFC operation. Electrochemistry communication 8: 133-136.

Bae. B, Ha. Y. H and Kim. D (2006): Nafion®-graft-polystyrene sulfonic acid membranes for direct methanol fuel cells. Journal of Membrane Science, Volume 276. Pp 51-58.

Basile. A, Paturzo. L, Iulianelli. A, Gatto. I and Passalacqua. E (2006): Sulfonated PEEK-WC membranes for proton-exchange membrane fuel cell: Effect of the increasing level of sulfonation on electrochemical performances. Journal of Membrane Science, Volume 281. Pp 377-385.

Chen. S, Bocarsly. A. B and Benzinger. J (2005): Nafion-layered sulfonated polysulfone fuel cell membranes. Journal of Power Sources, Volume 152. Pp 129-135.

Costamagna, P. and Srinivasan, S. (2001): Quantum Jumps in the PEMFC Science and Technology form the 1960s to the Year 2000. Part I. Fundamental Scientific Aspects. Journal of Power Sources, Volume 102. Pp 242.

Fang. J, Shen. P. K and Liu. L. Q (2007): Low methanol permeated sulfonated poly (phtahalazinone ether sulfone) membranes for DEMFCs. Journal of Membrane Sciences, volume 293, Pp 94-99.

Gao Y, Robertson G. P, Guiver M. D, Jian X, Serguei D. M Wang K and Kaliaguine S (2003): Sulfonation of poly (phthalaziones) with fuming sulfuric acid mixtures for proton exchange membrane materials. Journal of Membrane Science, Volume 227. Pp 39-50.

Gu. S, He. G, Wu. X, Li. C, Liu. H, Lin. C and Li. X (2006): Synthesis and characteristics of sulfonated poly(phthalazinone ether sulfone ketone) (SPPESK) for direct methanol fuel cell (DMFC). Journal of Membrane Science, Volume 281. Pp 121-129.

Haubold H. G, Vad T, Jangbluth H and Hiller P (2001): Nano structure of Nafion: a SAXS study. Journal of Electro-Chemical Acts, Volume 48. Pp 15559-1563.

Haynes. C (2001): Clarifying reversible efficiency misconceptions of high temperature fuel cells in relation to reversible heat engines. Journal of Power Sources, Volume 92. Pp 199-203.

Idibie. C. A (2009): Kinetics of Sulphonation of polystyrene butadiene rubber for fuel cell application. PhD thesis, University of the Witwatersrand, Johannesburg, South Africa. Unpublished Iyuke S. E, Mohammed A. B, Kadhum A. H Daud W. R and Rachid C (2003): Improved membrane and electrode assemblies for proton exchange membrane fuel cells. Journal of Power Sources, Volume 114. Pp 195-2002.

Jiang. R., Kunz. H. R and Fenton. J. M (2006): Composite silica/Nafion membrane prepared by tetra ethyl crtosilicate sol-gel reaction and solution casting for direct methanol fuel cells. Journal of membrane science 272: 116-124.

Karbochem report (2007): Emulsion Styrene Butadiene Rubber

Mahreni. A, Mohamad. A. B, Kadhum. A. A. H, Daud. W. R. W and Iyuke. S. E (2009): Nafion/silicon oxide/phosphotungstic acid nanocomposite membrane with enhanced proton conductivity. Journal of Membrane, Science, Volume 327. Pp 32-40.

Mehta. V and Cooper. J. S (2002): Review and analysis of PEM fuel cell design and manufacturing. Journal of power Sources, Volume 5044. Pp 1-22.

Mokrini. A, Huneault. M. A and Gerard. P (2006): Partially fluorinated proton exchange membranes based on PVDF-SEBS blends compatibilized with methylmethacrylate block copolymers. Journal of Membrane Science, Volume 283. Pp 74-83.

Park. J, Krishnan. P, Park. S, Park. G, Yang. T, Lee. W and Kim. C (2008): A study on fabrication of sulfonated poly (ether ether ketone)-based membrane-electrode assemblies for polymer electrolyte membrane fuel cells. Journal of Power Sources, Volume 128. Pp 642-650.

Sangeetha. D (2005): Conductivity and solvent uptake of proton exchange membrane based on (polystyrene-butylene)polystyrene triblock polymer. Journal of European Polymer, Volume 41. Pp 2644-2652.

Shen. M, Roy. S, Kuhlmann. J. W, Scott. K, Lovell. K and Horsfall. J. A (2005): Grafted polymer electrolyte membrane fir direct methanol fuel cells. Journal of Membrane Sciences, volume 251 Pp 121-130.

Wilson. M. S and Gottesfeld (1992): Thin-film catalyst layers for polymer electrolyte fuel cell electrodes. Journal of Applied Electrochem, Volume 22. Pp 1-7.

Xing P, Robertson G. P, Guiver M. D, Mikhailenko S. D, Wang K and Kaliaguine S (2004): Synthesis and characterization of sulfonated poly (ether ketone) for proton exchange membrane. Journal of Membrane Science, Volume 229. Pp 95-106.

Yang. C, Srinivasan. S, Bocarsly. A. B, Tulyani. S and Benziger. J. B (2004): A comparison of physical properties of Nafion and zirconium phosphate/Nafion composite membrane. Journal of Membrane Science, Volume 237. Pp 145-161.

The invention claimed is:

1. A proton exchange membrane comprising:
a sulphonated polystyrene-butadiene rubber membrane having carbon nanostructures homogenously dispersed therein, said nanostructures being allotropes of carbon having a bonding structure of $sp^2$ hybridized orbitals.

2. The proton exchange membrane according to claim 1, wherein the carbon nanostructures are carbon nanoballs.

3. A method of producing a proton exchange membrane according to claim 1, wherein polystyrene-butadiene rubber is dissolved and reacted with a sulphur containing compound yielding a sulphonated polystyrene-butadiene rubber which is further dissolved and reacted with carbon nanostructures said nanostructures being allotropes of carbon having a bonding structure of $sp^2$ hybridized orbitals to form the proton exchange membrane wherein said carbon nanostructures are homogenously distributed in said sulphonated polystyrene-butadiene rubber membrane.

4. The method according to claim 3, wherein the sulphur containing compound is chlorosulphonic acid and the carbon nanostructures are carbon nanoballs.

5. A method of claim 3, wherein the proton exchange membrane is hot pressed between the two ionically conductive electrodes to form a membrane electrode assembly.

6. A membrane electrode assembly comprising:
an electrolyte in the form of a proton exchange membrane comprising a sulphonated polystyrene-butadiene rubber membrane having carbon nanostructures homogenously dispersed therein said nanostructures being allotropes of carbon having a bonding structure of $sp^2$ hybridized orbitals, wherein the proton exchange membrane is sandwiched between two ionically conductive electrodes, the two ionically conductive electrodes being an anode and a cathode.

7. The membrane electrode assembly according to claim 6, wherein the ionically conductive electrodes are non-metallic electrodes, carbon electrodes or metallic electrodes.

8. The membrane electrode assembly according to claim 6, wherein the ionically conductive electrodes further comprise a catalyst.

9. The membrane electrode assembly according to claim 8, wherein the catalyst is a platinum catalyst, a carbon nanostructure-platinum catalyst or a carbon nanotube-platinum catalyst.

10. The membrane electrode assembly according to claim 6, wherein the anode and cathode are porous.

11. A method of producing a proton exchange membrane fuel cell, the method comprising:
connecting an external electrical circuit with a membrane electrode assembly of claim 6, so as to connect in electron flow communication an anode to a cathode;
connecting a fuel source to be in fluid communication with the anode; and
connecting an oxidant to be in fluid communication with the cathode, so that in use, fuel and the oxidant are introduced to the anode and cathode, respectively, the fuel is oxidized to at least protons and electrons, the electrons flow to the cathode via the external circuit and in so doing, the electron flow generates electricity and the protons traverse the proton exchange membrane of the membrane electrode assembly to the cathode, and the electrons and protons at the cathode reduce the oxidant to form a by-product.

12. The method according to claim 11, further comprising: connecting a first and second diffusion layer to the anode and cathode, respectively, such that the diffusion layers facilitate the passage of electrons and/or connecting a first and second cooling means to the first and second diffusion layers such that the first and second cooling means are in heat exchange communication with the first and second diffusion layers.

13. A proton exchange membrane fuel cell comprising:
   a membrane electrode assembly comprising an electrolyte in the form of a proton exchange membrane, comprising a sulphonated polystyrene-butadiene rubber membrane having carbon nanostructures homogenously dispersed therein, said nanostructures being allotropes of carbon having a bonding structure of $sp^2$ hybridized orbitals wherein the proton exchange membrane is sandwiched between two ionically conductive electrodes, being an anode and a cathode;
   an external electrical circuit facilitating the flow of electrons from the anode to the cathode to generate electricity;
   a fuel source supply means to supply the anode with fuel; and
   an oxidant supply means to supply the cathode with an oxidant, so that in use, fuel and an oxidant are introduced to the anode and cathode, respectively, the fuel is oxidized to at least protons and electrons, the electrons flow to the cathode via the external circuit and in so doing, the electron flow generates electricity, and the protons traverse the proton exchange membrane to the cathode, and the electrons and protons at the cathode reduce the oxidant to form a by-product.

14. The proton exchange membrane fuel cell according to claim 13, wherein the fuel source is hydrogen, the oxidant is oxygen and/or the by-product is water.

15. The proton exchange membrane fuel cell according to claim 13, further comprising a first and second diffusion layer, the first diffusion layer located adjacent the anode and the second diffusion layer located adjacent the cathode.

16. The proton exchange membrane fuel cell according to claim 15, wherein the external circuit extends between the first and second diffusion layers facilitating flow of electrons from the anode through the first diffusion layer, through the external circuit, through the second diffusion layer and to the cathode.

17. The proton exchange membrane fuel cell according to claim 15, further comprising a first and second cooling means for temperature regulation of the proton exchange membrane fuel cell, the first cooling means located adjacent the first diffusion layer and the second cooling means located adjacent the second diffusion layer.

18. The proton exchange membrane fuel cell according to claim 17, wherein the first and second cooling means are water cooling means comprising a conduit for water flow.

19. The proton exchange membrane according to claim 13, wherein the ionically conductive electrodes further comprises a catalyst.

20. The proton exchange membrane according to claim 19, wherein the catalyst is a platinum catalyst, a carbon nanostructure-platinum catalyst or a carbon nanotude-platinum catalyst.

* * * * *